United States Patent
Rubin

(10) Patent No.: US 12,219,071 B1
(45) Date of Patent: Feb. 4, 2025

(54) SYSTEMS AND METHODS FOR FACILITATING CRYPTOGRAPHIC ATTESTATION CHAINS USING BONDED ORACLES

(71) Applicant: JUDICA, INC., Reno, NV (US)

(72) Inventor: Jeremy Lloyd Rubin, Reno, NV (US)

(73) Assignee: Judica, Inc., Reno, NV (US)

( * ) Notice: Subject to any disclaimer, the term of this patent is extended or adjusted under 35 U.S.C. 154(b) by 253 days.

(21) Appl. No.: 17/989,269

(22) Filed: Nov. 17, 2022

(51) Int. Cl.
  H04L 9/08 (2006.01)
  H04L 9/00 (2022.01)
  H04L 9/32 (2006.01)
  H04L 9/06 (2006.01)
  H04L 9/40 (2022.01)

(52) U.S. Cl.
  CPC ............ H04L 9/3247 (2013.01); H04L 9/088 (2013.01); H04L 9/50 (2022.05); H04L 2209/56 (2013.01)

(58) Field of Classification Search
  CPC ......... H04L 9/3247; H04L 9/088; H04L 9/50; H04L 2209/56
  See application file for complete search history.

(56) References Cited

U.S. PATENT DOCUMENTS

| | | | | |
|---|---|---|---|---|
| 2022/0385477 | A1* | 12/2022 | Kravitz | ............... H04L 9/3247 |
| 2024/0259222 | A1* | 8/2024 | Kaplan | ............ G06Q 20/3674 |

FOREIGN PATENT DOCUMENTS

| | | | | |
|---|---|---|---|---|
| WO | WO-2023073678 A1 * | 5/2023 | ............ | H04L 9/008 |

OTHER PUBLICATIONS

Keerthi Nelaturu, John Adler, Marco Merlini, Ryan Berryhill, Neil Veira, Zissis Poulos, and Andreas Veneris; "On Public Crowdsource-Based Mechanisms for a Decentralized Blockchain Oracle"; IEEE Transactions on Engineering Management; vol. 67, No. 4, Nov. 2020; Publisher: IEEE; pp. 1444-1458 (Year: 2020).*
"tbDEX: A Liquidity Protocol v0.1" Nov. 19, 2021. (pp. 1-18).
Tim Ruffing, "Liar, Liar, Coins on Fire!" Oct. 2015. The 22nd ACM SIGSAC Conference (pp. 12).
Robin Linus, "Stakechain: A Bitcoin-backed Proof-of-Stake" Dec. 20, 2021. https://coins.github.io/stakechains.pdf (pp. 13).

* cited by examiner

*Primary Examiner* — Fatoumata Traore
*Assistant Examiner* — Courtney D Fields
(74) *Attorney, Agent, or Firm* — Esplin & Associates, PC

(57) ABSTRACT

Systems and methods to facilitate cryptographic attestation chains using bonded oracles are disclosed. Exemplary implementations may publish a bond identifier that identifies a bond; record an initial attestation on a public registry, wherein the initial attestation includes an initial nonce that is based on a secret value; generate a sequence of attestations that form a chain; publish the sequence of attestations; initiate redemption of the bond, wherein the redemption is delayed by a wait period; compare individual nonces of previously published attestations to previously recorded nonces in the sequence; responsive to a match between the previously recorded nonces, publish a notification regarding nonce reuse that exposes both the secret value and the bond; responsive to exposure of the secret value, forfeit the bond identified by the bond identifier; responsive to the redemption transaction being recorded and further responsive to expiration of the wait period, redeem the bond; and/or other steps.

17 Claims, 5 Drawing Sheets

SYSTEMS AND METHODS FOR FACILITATING CRYPTOGRAPHIC ATTESTATION CHAINS USING BONDED ORACLES

FIELD OF THE DISCLOSURE

The present disclosure relates to systems and methods to facilitate cryptographic attestation chains using bonded oracles, where the bonds are typically escrows of funds on a public ledger such as the Bitcoin network and the attestations are statements published separately.

BACKGROUND

Distributed or decentralized registries are known tools and techniques to produce a secure record of rights pertaining to assets, articles, and transactions. Public registries such as the Bitcoin network are known. Various types of oracles that provide informational services on public registries are known.

SUMMARY

One aspect of the present disclosure relates to a system configured to facilitate cryptographic attestation chains using bonded oracles. The system may include one or more oracle servers, a monitoring server, a collateral service provider, and/or other components. The system may include one or more processors configured by machine-readable instructions. The system may be configured to publish a bond identifier that identifies a bond. The system may be configured to record an initial attestation on a public registry, wherein the initial attestation includes an initial nonce that is based on a secret value. The system may be configured to generate a sequence of attestations that form a chain. The system may be configured to publish the sequence of attestations. The system may be configured to initiate redemption of the bond, wherein the redemption is delayed by a wait period. The system may be configured to compare individual nonces of previously published attestations to previously recorded nonces in the sequence. The system may be configured to, responsive to a match between the previously recorded nonces, publish a notification regarding nonce reuse that exposes both the secret value and the bond. The system may be configured to, responsive to exposure of the secret value, forfeit the bond identified by the bond identifier. The system may be configured to, responsive to the redemption transaction being recorded and further responsive to expiration of the wait period, redeem the bond. The system may be configured to perform other steps.

Another aspect of the present disclosure related to a method of facilitating cryptographic attestation chains using bonded oracles. The method may include publishing a bond identifier that identifies a bond. The method may include recording an initial attestation on a public registry, wherein the initial attestation includes an initial nonce that is based on a secret value. The method may include generating a sequence of attestations that form a chain. The method may include publishing the sequence of attestations. The method may include initiating redemption of the bond, wherein the redemption may be delayed by a wait period. The method may include comparing individual nonces of previously published attestations to previously recorded nonces in the sequence, The method may include, responsive to a match between the previously recorded nonces, publishing a notification regarding nonce reuse that exposes both the secret value and the bond. The method may include, responsive to exposure of the secret value, forfeiting the bond identified by the bond identifier. The method may include, responsive to the redemption transaction being recorded and potentially further responsive to expiration of the wait period, redeeming the bond. The method may include other steps.

As used herein, any association (or relation, or reflection, or indication, or correspondency, or correlation) involving servers, processors, client computing platforms, instructions, operations, identifiers, attestations, determinations, detections, comparisons, transactions, presentations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, local and/or remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
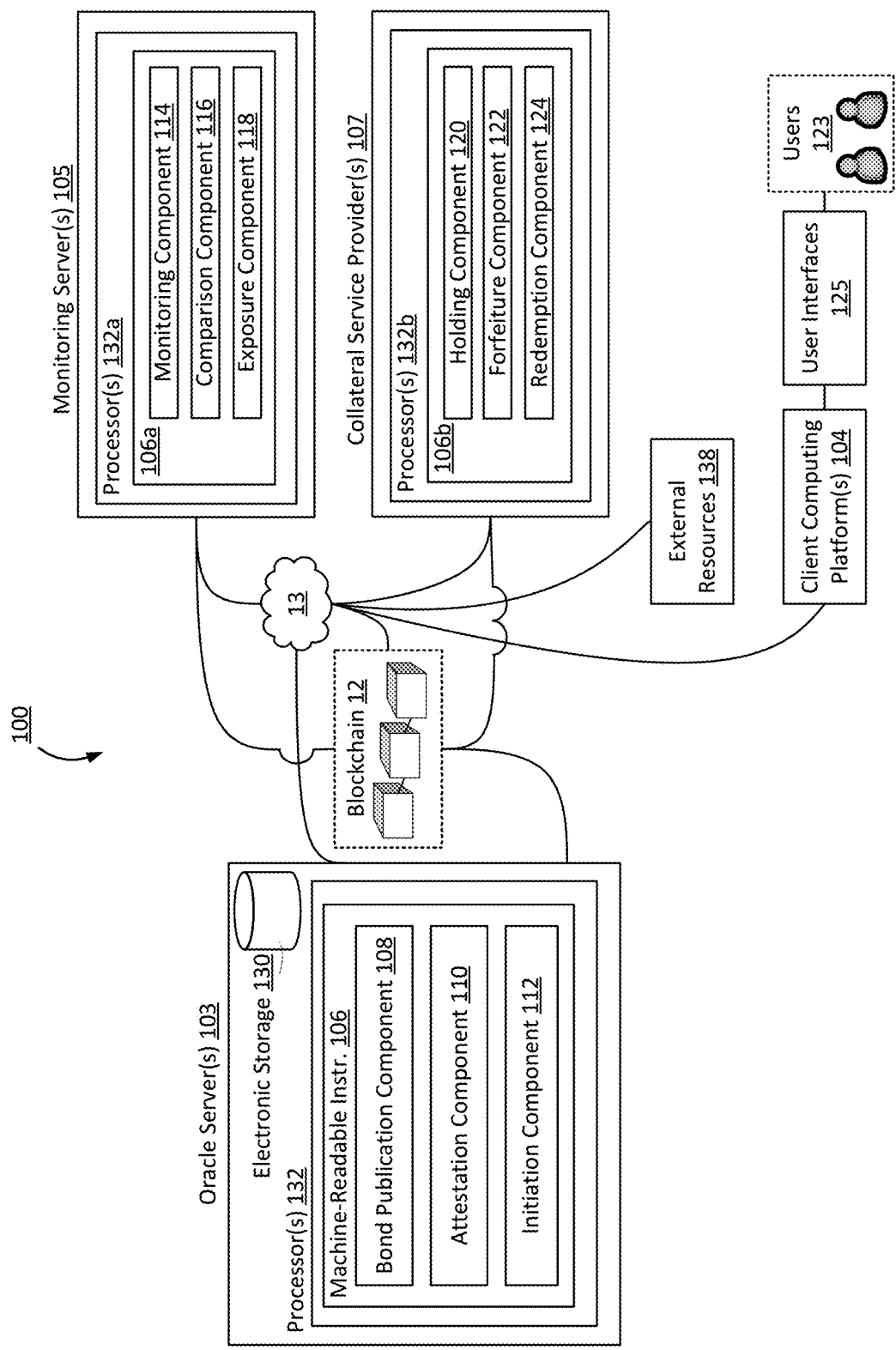
FIG. 1 illustrates a system configured to facilitate cryptographic attestation chains using bonded oracles, in accordance with one or more implementations.

FIG. 1 illustrates a system 100 configured to facilitate cryptographic attestation chains using bonded oracles, in accordance with one or more implementations. By virtue of the systems and methods described in this disclosure, blockchain oracles are forced and/or bonded to publish cryptographic attestation chains on one or more public registries in a predetermined and reliable manner, on penalty of losing a bond or collateral when caught cheating and/or otherwise failing to perform as expected. For such bonded oracles, cheating would be any behavior contrary to the predetermined and reliable manner, including but not limited to publishing inconsistent information. As used herein, the term "bonded" refers to being secured by a bond, a collateral, and/or another type of security. Due to the bond being at risk, the bonded oracle is disincentivized from publishing inconsistent information.

As used herein, a public registry may be referred to as "permanent" when recorded information is expected to be available by some means of retrieval, immutable, and can substantially not be altered or deleted (unless one or more of the fundamental principles underlying these registries is cracked, hacked, broken, and/or otherwise reverse-engineered). By way of non-limiting example, these registries use certain cryptographic primitives such as one-way hashing functions and digital signature algorithms that are expected to remain secure (and not reversible, for example).

System 100 may include one or more of oracle server(s) 103, monitoring server(s) 105, collateral service provider(s) 107, real-world information server(s) 119, client computing platform(s) 104, user interface(s) 125, external resource(s) 138, blockchain(s) 12, and/or other components. Some implementations use fewer components. Users 123 may include one or more of a first user, a second user, and/or other parties. As used in descriptions herein, any use of the term "user" may refer to user(s) 123.

In some implementations, system 100 may be configured to implement one or more (permanent) public registries, including but not limited to blockchain 12, or a node of blockchain 12. In other implementations, one or more (permanent) public registries may be implemented by entities external to system 100. In some implementations, one or more public registries may be decentralized and/or immutable registries. In some implementations, blockchain 12 may be maintained by one or more distributed computing platforms (not shown in FIG. 1). In some implementations, a distributed computing platform may be implemented by a set of client computing platforms and/or servers. In some implementations, the distributed computing platform may support a virtual machine (not shown in FIG. 1) that forms a runtime environment for smart contracts and/or other executable code. A distributed computing platform may include electronic storage configured to store part or all of blockchain 12. For example, smart contracts may be stored on blockchain 12. In some implementations, the distributed computing platform may be similar to or based on the BITCOIN network. For example, blockchain 12 may be part of the BITCOIN mainnet. In some implementations, the distributed computing platform may be similar to or based on the EOSIO platform. In some implementations, the distributed computing platform may be ETHEREUM. In some implementations, the distributed computing platform may be similar to or based on ETHEREUM. In some implementations, the distributed computing platform may be the POLYGON platform. In some implementations, the distributed computing platform may be similar to or based on the POLYGON platform. In some implementations, the distributed computing platform may be the SOLANA platform. In some implementations, the distributed computing platform may be similar to or based on the SOLANA platform. In some implementations, the virtual machine may be a distributed and/or decentralized virtual machine.

Elements of blockchain 12 may be grouped together in units that are referred to as blocks. For example, an individual block may include one or more digital assets, one or more transactions or transaction scripts, executable code (e.g., smart contracts), and/or other information. For example, an individual block may be linked to one or more other individual blocks. Individual blocks may be linked or chained together to form a structure of blocks and/or a hierarchy of blocks, such as, e.g., a chain of blocks.

In some implementations, blockchain 12 may be append-only (such that existing blocks are immutable once they have been added to this registry). In some implementations, existing blocks of one or more public registries can substantially not be altered or deleted, unless multiple copies are altered. This is unlikely to happen provided that the multiple copies are stored on different computing platforms, e.g., in different geographical locations. Public registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may be considered to provide one-way encryption and/or immutable identifiers. By way of non-limiting example, the hashing function may be SHA-256, BLAKE2, SHAKE256, and/or another hashing function. Contents of individual blocks, transactions, and/or other types of information may be digitally signed in a manner that proves integrity and/or prevents tampering, e.g., by providing authentication, as well as non-repudiation.

One or more of oracle server(s) 103, monitoring server(s) 105, and collateral service provider(s) 107 may be configured to communicate with one or more client computing platforms 104 according to a client/server architecture and/or other architectures. Client computing platform(s) 104 may be configured to communicate with other client computing platforms via any or all of oracle server(s) 103, monitoring server(s) 105, and collateral service provider(s) 107 according to a peer-to-peer architecture and/or other architectures. Users may access system 100 via client computing platform(s) 104. In some implementations, communication within and with system 100 may use one or more networks 13 such as the Internet and/or other communication networks.

One or more of oracle server(s) 103, monitoring server(s) 105, and collateral service provider(s) 107 may include electronic storage 130, processor(s) 132, machine-readable instructions 106, and/or other components. One or more of oracle server(s) 103, monitoring server(s) 105, and collateral service provider(s) 107 may be configured by machine-readable instructions 106. Machine-readable instructions 106 may include one or more instruction components. Instruction components (for any set of machine-readable instructions) may include computer program components. The instruction components may include one or more of a bond publication component 108, an attestation component 110, an initiation component 112, a monitoring component 114, a comparison component 116, an exposure component 118, a holding component 120, a forfeiture component 122, a redemption component 124, and/or other instruction components. Processor(s) 132a and processor(s) 132b may be similar to processor(s) 132 as described elsewhere in this disclosure, though included in monitoring server 105 and collateral servicer provider 107, respectively, as depicted in FIG. 1. Machine-readable instructions 106*a* and machine-readable instructions 106*b* may be similar to machine-readable instructions 106 as described elsewhere in this disclosure, though included in monitoring server 105 and collateral servicer provider 107, respectively, as depicted in FIG. 1.

Bond publication component 108 may be configured to publish, record, and/or otherwise announce bond identifiers that identify bonds, collaterals, and/or other types of (financial) security. In some implementations, bond publication component 108 may publish a bond identifier on a public registry, including but not limited to blockchain 12. A particular bond, collateral, and/or other type of security may represent something of economic value, such as an amount of economic value, that is at stake based on operations of oracle server 103. In some implementations, the particular bond, collateral, and/or other type of security may be held by collateral service provider 107. In some implementations, bond publication component 108 may be part of oracle server 103, as depicted in FIG. 1. For example, a particular bond may be provided by a user, administrator, or stakeholder of oracle server 103 as a promise to other users who rely on the operations of oracle server 103 (e.g., to publish one or more cryptographic attestation chains on one or more public registries in a predetermined and reliable manner) that oracle server 103 will not cheat and/or otherwise fail to perform as expected, on penalty of losing the particular bond. For example, a particular bond may be a particular amount of Bitcoin that is only accessible to someone who knows a particular private key (in other words, the owner of the particular private key owns the particular amount of Bitcoin). The particular private key may be part of the bond. As soon as the particular private key is exposed, the particular amount of Bitcoin could be transferred, stolen, permanently destroyed (burned), and/or otherwise disappear or be made (possibly permanently) unavailable. As another example, a bond could be a non-fungible token (NFT), especially a valuable one. In some implementations, a particular individual bond corresponds to a particular individual attestation chain.

Attestation component 110 may be configured to publish, record, and/or otherwise announce attestations on a public registry, including but not limited to blockchain 12. In particular, the attestations may include an initial attestation that serves as the start of a sequence or chain of attestations (also referred to as "attestation chain"). An initial attestation may include an initial (digital) signature, an initial nonce, a message, and/or other information. For example, an attestation could be a statement of information that should be revealed according to some rule. For example, an attestation could include a message containing real-world information. For example, an attestation could include a message containing in-game information, including but not limited to the status of in-game items, including but not limited to in-game items that have been listed for sale. For example, an attestation could sign certain transactions, e.g., using a particular signing key. In some implementations, individual attestations may include timestamps or other information reflecting the current time (including but not limited to information reflecting a heartbeat or clock).

In some implementations, the attestations could be generic blockchain ledger operations for arbitrary smart contracts. For example, one smart contract could represent a token (such as an Ethereum Request for Comment (ERC)-20 token, or ERC-20 token, or such as a non-fungible token, or NFT), and the attestation chain could commit to a request to transfer such a token to another holder. For example, the smart contract tokens could represent pieces in a game (such as properties and money in MONOPOLY™; roads, settlements, wheat, sheep, wood, and ore in CATAN™; or Steel, Silicon, Concrete, and power plant properties in MASTERMINE, a bitcoin mining simulator game), and the transactions represent moves in the game. In some cases, the game requires multiple attestation chains, some with a sequencer role of determining in what order moves and/or transactions bearing attestations from other attestation chains should be applied to the shared state. For example, in the MASTERMINE™ game, one sequencer attestation chain commits to the moves of a player attestation chain. Players individually have a balance of tokens representing Mining Computers, Steel, Silicon, Concrete, and Bitcoin. Players submit moves trading Bitcoin for the other resource tokens, which are traded through a Constant Function Market Maker (a smart contract decentralized exchange). Players then use the resource tokens to build different varieties of powerplant NFT, which once operational may be armed with Mining Computers. Players then receive revenue for their powerplant, and compete to earn the most revenue before the end of the game. After each move, the operators of the game may sign a Bitcoin transaction which distributes funds to the players. This type of game design can be utilized for many different types of games, not limited to turn based board games, but can be thought of more generally. For example, an LLC Operating Agreement can be thought of as a game: it has players which are members and customers, and each may perform certain operations. The LLC Operating Agreement's state and communications can be modeled as a game suitable to be committed and executed via the attestation chain architecture described herein. Tokens and NFTs may represent different items relevant to the LLC, such as coupons and inventories of goods. For example, a web service provider might use NFTs to represent servers, and tokens to represent internet bandwidth allotments.

In some cases, the initial signature may be based on a particular bond identifier. In some implementations, creating or generating the initial nonce may be based on a secret value that is not published or otherwise revealed. For example, an initial nonce "P" may be generated by multiplying a secret value "p" with a (predetermined) value G, as follows: P=pG. Initial nonce "P" is revealed in the initial attestation, but secret value "p" cannot feasibly be derived from initial nonce "P". Subsequent attestations in the sequence or chain started by a particular initial attestation are linked to each other, e.g., in a manner similar to blocks in a blockchain where at least a part of an attestation—such as the message—is hashed and included in the next attestation. The second attestation uses the initial nonce "P" to generate its signature. The second attestation includes and reveals a second nonce "Q" that may be based on a secret value (e.g., the same secret value "p"). Each next attestation uses the nonce of the preceding attestation to generate its signature, and generates and reveals a new nonce that will be used by the subsequent attestation.

Attestation component 110 may be configured to generate a sequence of attestations that form a chain, e.g., starting with an initial attestation. Individual attestations may include individual signatures, individual nonces, individual messages, and/or other individual information. Individual signatures may use the nonce revealed in the preceding attestation. Attestation chains should not have branches. Attestation component 110 may be configured to publish sequences of attestations on a public registry, including but not limited to blockchain 12. In some implementations, attestation component 110 may be part of oracle server 103, as depicted in FIG. 1.

Figure 3:
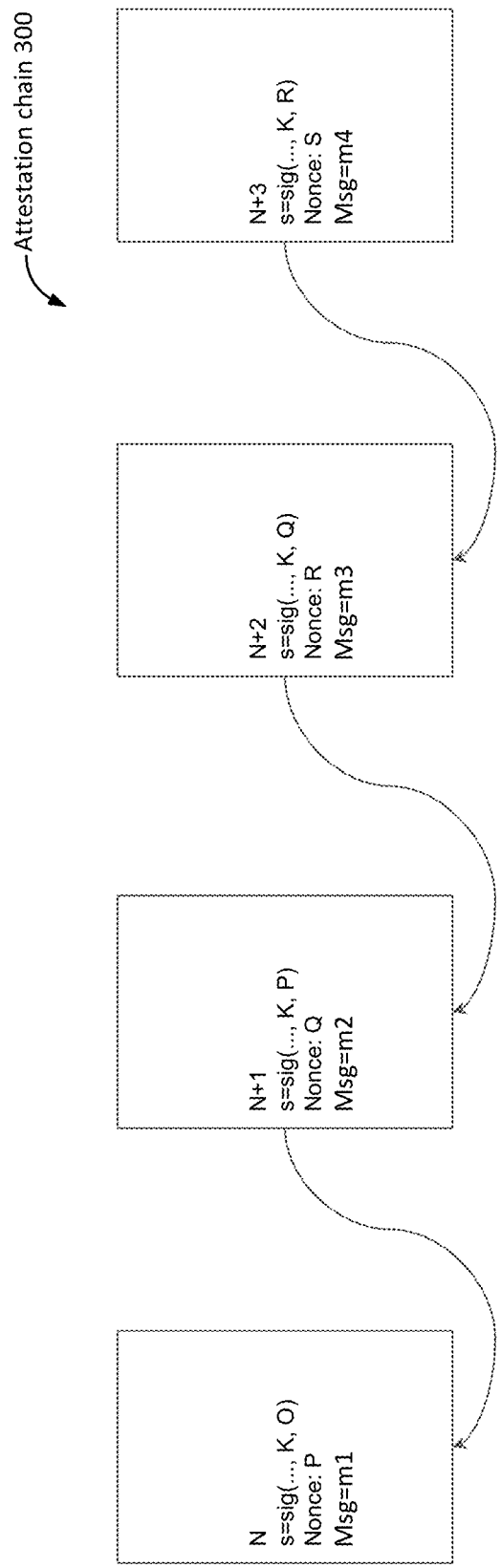
FIG. 3 illustrates an exemplary attestation chain as may be used by a system configured to facilitate cryptographic attestation chains using bonded oracles, in accordance with one or more implementations.

By way of non-limiting example, FIG. 3 illustrates an exemplary attestation chain 300 as may be used by system 100. As depicted, attestation chain 300 included four attestations linked together, starting at an attestation "N" which includes a signature based on a key "K", and subsequently proceeding to an attestation "N+1", an attestation "N+2", and an attestation "N+3". Each attestation typically includes some data or message, here referred to in order as "m1", "m2", "m3", and "m4". In some cases, numbering attestations in sequential order may help identify and order individual attestations in an attestation chain. Attestation "N" includes a nonce "P". The signature of attestation "N+1" includes nonce "P". Attestation "N+1" includes a nonce "Q". The signature of attestation "N+2" includes nonce "Q". Attestation "N+2" includes a nonce "R". The signature of attestation "N+3" includes nonce "R". Attestation "N+3" includes a nonce "S", to be used for a future attestation following attestation "N+3".

In some implementations, attestation component 110 may be configured to publish and append a new attestation to an existing attestation chain such that two adjacent attestations are published at least a particular period apart. In some implementations, attestation component 110 may be configured to publish and append a new attestation to an existing attestation chain such that two adjacent attestations are published no more than a particular period apart. In some implementations, attestation component 110 may be configured to publish and append a new attestation to an existing attestation chain such that two adjacent attestations are published at certain period apart ranging from a predetermined minimum duration to a predetermined maximum duration. In some cases, e.g., when using verifiable delay functions, the claimed period between two adjacent published attestations may be proven and/or guaranteed. Verifiable delay functions are cryptographic primitives that allow a prover to show a verifier that a certain amount of time running a function was spent (typically while doing sequential work), and do it in a way that the verifier can check the result, preferably quickly.

Initiation component 112 may be configured to initiate redemption of bonds. In some implementations, initiation component 112 may initiate a redemption of a particular bond through a redemption transaction that is recorded on a public registry, including but not limited to blockchain 12. In some implementations, the subsequent redemption is delayed by a (predetermined) wait period, which may be from the moment of recording the redemption transaction, or from another predefined moment. This wait period allows the public to determine whether oracle server 103 performed as expected (e.g., published one or more cryptographic attestation chains on one or more public registries in a predetermined and reliable manner, and in particular, whether the published sequence of attestations contains nonce reuse, or duplicated nonces). For example, the wait period could be 1 week, 2 weeks, 3 weeks, a month, and/or other duration. During the wait period, the particular bond is still at risk. After the wait period, actual redemption may occur. In some implementations, initiation component 112 may be part of oracle server 103, as depicted in FIG. 1. In some implementations, oracle server 103 may be required to initiate the redemption of a particular bond through a redemption transaction that is recorded on a public registry, such as blockchain 12

Monitoring component 114 may be configured to obtain, gather, and/or retrieve (all or some of the information in) previously published attestations. In particular, monitoring component 114 may obtain (one or more chains of) previously published attestations from one or more oracle servers 103, or at least the individual nonces of the previously published attestations. In some implementations, monitoring component 114 may obtain previously published (chains of) attestations from one or more public databases. In some implementations, monitoring component 114 may obtain previously published (chains of) attestations from one or more monitoring services. In some implementations, monitoring component 114 may be part of monitoring server 105, as depicted in FIG. 1.

Comparison component 116 may be configured to compare individual nonces (e.g., as obtained by monitoring component 114 from a particular chain of attestations) to determine whether any nonces have been reused or otherwise duplicated. In other words, comparison component 116 may be configured to detect nonce reuse. The expected operation for a bonded oracle means no nonces are reused or otherwise duplicated, and the published attestation chain has no branches. A deviation from this expectation indicates cheating and/or a failure to perform properly in a predetermined and reliable manner. In some implementations, comparison component 116 may be part of monitoring server 105, as depicted in FIG. 1.

Exposure component 118 may be configured to notify and/or otherwise publish notifications regarding use or reuse of a (duplicate) nonce in a particular published attestation chain. Exposure component 118 may publish a particular notification based on one or more comparisons by comparison component 114. A particular publication by exposure component 118 may include one or more of (i) two or more attestations from a particular sequence of attestations, or at least some information from the two or more attestations, (ii) two or more signatures included in the two or more attestations, (iii) the duplicate nonce, and/or other information. Publishing such a particular publication may expose the secret value (used for the generation of at least the initial nonce of the particular published attestation chain), the bond (corresponding to the particular published attestation chain), and/or other information. Such exposure causes the particular bond to be at risk. If no nonce is reused, exposure component 118 may not publish the particular notification, and the particular bond will not be at risk. In some implementations, exposure component 118 may be part of monitoring server 105, as depicted in FIG. 1.

Figure 4:
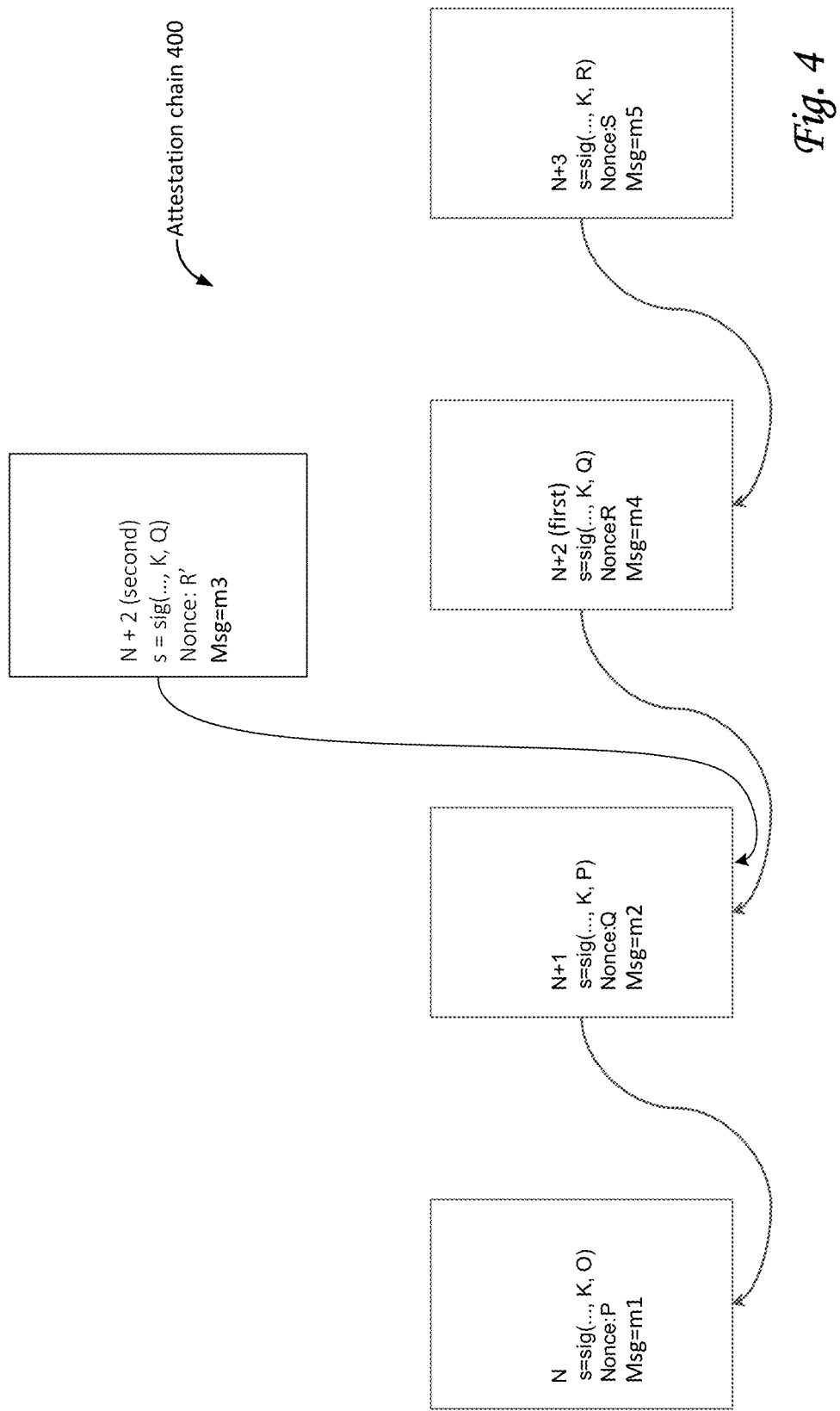
FIG. 4 illustrates an exemplary equivocating attestation chain as may be used by a system configured to facilitate cryptographic attestation chains using bonded oracles, in accordance with one or more implementations.

By way of non-limiting example, FIG. 4 illustrates an exemplary attestation chain 400 as may be used by system 100. As depicted, attestation chain 400 included five attestations linked together, starting at an attestation "N" which includes a signature based on a key "K", and subsequently proceeding to an attestation "N+1", an attestation "N+2 (first)", and an attestation "N+3". Additionally, attestation "N+1" is also followed by an attestation "N+2 (second)", which is not supposed to happen if oracle server 103 publishes this attestation chain in the expected predetermined and reliable manner. Each attestation typically includes some data or message, here referred to as "m1", "m2", "m3", "m4", and "m5". Attestation "N" includes a nonce "P". The signature of attestation "N+1" includes nonce "P". Attestation "N+1" includes a nonce "Q". The signature of attestation "N+2 (first)" includes nonce "Q". Attestation "N+2 (first)" includes a nonce "R". However, the signature of attestation "N+2 (second)" also includes nonce "Q". Accordingly, nonce "Q" has been reused and duplicated. The signature of attestation "N+3" includes nonce "R". Attestation "N+3" includes a nonce "S", to be used for a future attestation following attestation "N+3". Comparison component 116 will detect the nonce reuse of nonce "Q", causing exposure component 118 to publish a notification regarding nonce "Q", which exposes the particular bond associated with attestation chain 400.

Referring to FIG. 1, holding component 120 may be configured to hold bonds. For example, holding component 120 may hold the particular bond identified by a particular bond identifier (e.g., the particular bond identifier published by bond publication component 108). The particular bond may be associated with a particular attestation chain or sequence of attestations. In some implementations, holding component 120 may be part of collateral service provider 107, as depicted in FIG. 1. For trustworthy operations, holding component 120 should be owned and operated independently from oracle server 103.

In some implementations, collateral service provider 107 may be implemented as a server (e.g., a collateral server) including one or more processors configured by machine-executable instructions (as depicted in FIG. 1). In other implementations, collateral service provider 107 may be implemented as one or more smart contracts on a public registry, including but not limited to blockchain 12. In other implementations, collateral service provider 107 may be implemented as one or more contracts and/or sub-contracts (recursively) operating within one or more oracle servers 103. In some implementations, collateral service provider 107 may provide an Application Programming Interface (API). For example, such an API may be responsive to a particular cryptographic key (e.g., the particular private key) included in a particular bond. Certain operations by holding component 120, forfeiture component 122, and redemption component 124 to hold, forfeit, or redeem bonds may be accomplished through function calls of this Application Programming Interface (API).

Forfeiture component 122 may be configured to forfeit bonds. Forfeiture component 122 may forfeit a particular bond responsive to exposure of the secret value (e.g., by exposure component 118, e.g., through a notification). In some implementations, a forfeited bond may be transferred to a user (using the exposed secret value). In some implementations, a forfeited bond may be permanently destroyed (burned), and made unavailable to someone or to anyone. In some implementations, a forfeited bond may be transferred to a charity. In some implementations, forfeited bonds may be held in escrow or by a third party for a long time (say, years, or decades) before being transferred. In some implementations, the use of a bond may be limited and/or otherwise restricted using a smart contract such as a covenant, including but not limited to the types of covenants supports by using Check Template Verify (CTV), an opcode for BITCOIN scripts defined in BITCOIN IMPROVEMENT PROPOSAL (BIP) 119, or BIP 119. In some implementations, forfeiture component 122 may be part of collateral service provider 107, as depicted in FIG. 1.

Redemption component 124 may be configured to redeem bonds. Redemption component 124 may redeem a particular bond responsive to recordation of a particular redemption transaction. Alternatively, and/or simultaneously, redemption component 124 may redeem a particular bond responsive to expiration of a particular wait period (as used by initiation component 112). In some implementations, redemption component 124 may be part of collateral service provider 107, as depicted in FIG. 1.

Figure 5:
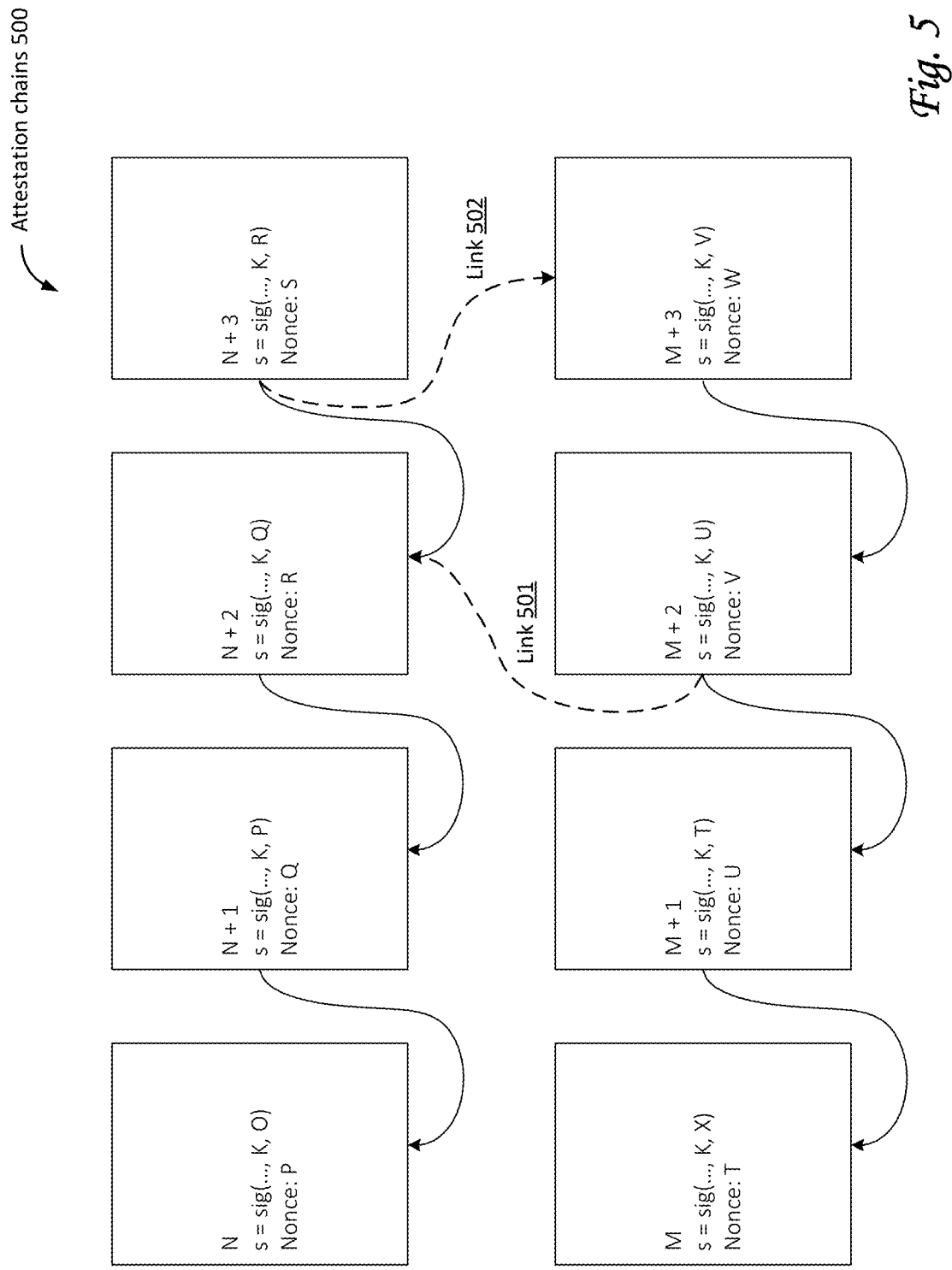
FIG. 5 illustrates a pair of attestation chains as may be used by a system configured to facilitate cryptographic attestation chains using bonded oracles, in accordance with one or more implementations.

In some implementations, multiple different attestation chains may be linked together. For example, a given attestation in a first attestation chain may link to a particular attestation in a second attestation chain. By way of non-limiting example, such a link may be implemented by hashing some part of the particular attestation (e.g., the message) in the given attestation. Through such links as a link 501 and a link 502, some of the different individual attestations may be guaranteed to have been published before or after certain moments in time (or before or after other attestations). By way of non-limiting example, FIG. 5 illustrates a pair of attestation chains 500 (including a top attestation chain at the top of FIG. 5 and a bottom attestation chain at the bottom of FIG. 5) as may be used by system 100. The top chain may be similar to attestation chain 300 as depicted in FIG. 3, and may have been published by a first oracle server 103. The bottom chain similarly depicts four individual attestations, labeled "M", "M+1", "M+2", and "M+3", and may have been published by a second oracle server 103. Individual attestations may include some data or message, though not depicted in FIG. 5. Note that link 501 depicts that attestation "M+2" refers to attestation "N+2", thereby proving that attestation "M+2" was published after attestation "N+2". Note that link 502 depicts that attestation "N+3" refers to attestation "M+3", thereby proving that attestation "N+3" was published after attestation "M+3". As another example, attestations could include (hashed versions of) headers of blocks of public blockchains to indicate a publication occurred after that block.

In some implementations, oracle server 103 may be configured to use bonds that having a fixed expiry time, so no transaction to initiate redemption may be needed. After expiration of the fixed expiry time, the bond or collateral may need to be renewed to continue publication of such attestation chains.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other player interface devices configured to receive and/or convey player input. In some implementations, one or more user interfaces 125 may be included in one or more client computing platforms 104. In some implementations, one or more user interfaces 125 may be included in system 100.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, individual client computing platforms 104 may be configured to determine geolocation information for a current location of the individual client computing platforms 104. For example, an individual client computing platform 104 may include a geolocation sensor (e.g., a Global Positioning System or GPS device). The geolocation sensor may be configured to generate output signals conveying GPS information (e.g., a set or range of GPS coordinates) and/or other geolocation information, which may be used by the individual client computing platform 104 to determine the current location of the individual client computing platform 104.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, one or more external resources 138 may provide information (e.g., event information regarding events that are occurring and/or have occurred in the real world) to components of system 100. In some implementations, external resources 138 may include one or more real-world information servers or blockchain oracles, including but not limited to immediate-read oracles, a publish-subscribe oracles, a request-response oracles, and/or other types of (blockchain) oracles.

System 100 (in particular one or more of oracle server(s) 103, monitoring server(s) 105, and collateral service provider(s) 107) may include communication lines, or ports to enable the exchange of information with a network and/or other computing platforms. Illustrations in FIG. 1 are not intended to be limiting. One or more of oracle server(s) 103, monitoring server(s) 105, and collateral service provider(s) 107 may include a plurality of hardware, software, and/or firmware components operating together to provide the functionality attributed herein. For example, one or more of oracle server(s) 103, monitoring server(s) 105, and collateral service provider(s) 107 may be implemented by a cloud of computing platforms operating together.

Electronic storage 130 may comprise non-transitory storage media that electronically stores information. The electronic storage media of electronic storage 130 may include one or both of system storage that is provided integrally (i.e., substantially non-removable) with system 100 and/or removable storage that is removably connectable to system 100 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from system 100, information received from client computing platform(s) 104, and/or other information that enables system 100 to function as described herein.

Processor(s) 132 may be configured to provide information processing capabilities. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only.

In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, and/or 124, and/or other components. Processor(s) 132 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 132 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes only, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 132 may be configured to execute one or more additional components that may perform some or all of the functionality attributed below to one of components 108, 110, 112, 114, 116, 118, 120, 122, and/or 124.

Figure 2:
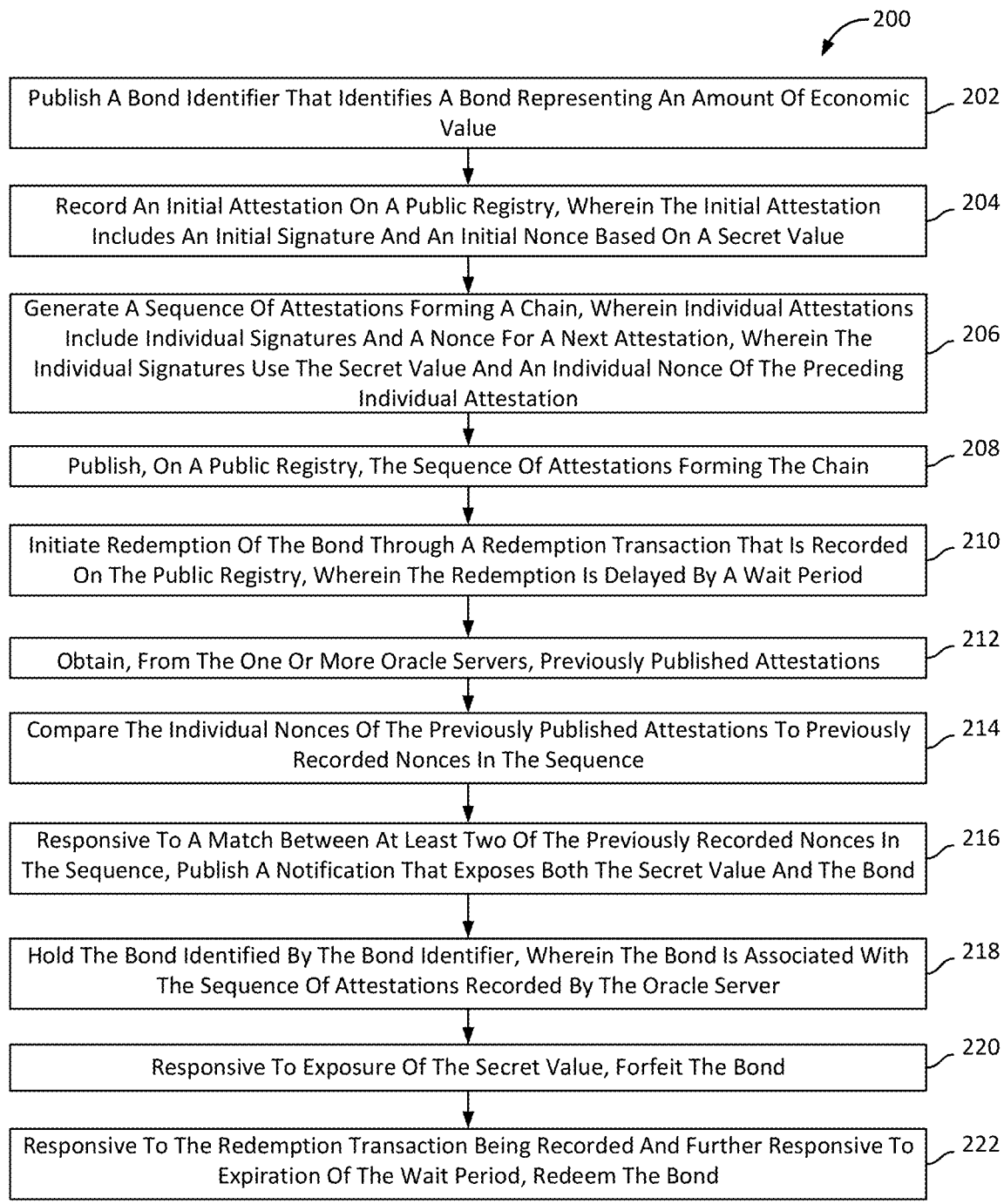
FIG. 2 illustrates a method of facilitating cryptographic attestation chains using bonded oracles, in accordance with one or more implementations.

FIG. 2 illustrates a method 200 of facilitating cryptographic attestation chains using bonded oracles, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a bond identifier is published, by one or more oracle servers, wherein the bond identifier identifies a bond. The bond is held by a collateral service provider. The bond represents an amount of economic value that is at stake based on operations of the one or more oracle servers. In some embodiments, operation 202 is performed by a bond publication component the same as or similar to bond publication component 108 (shown in FIG. 1 and described herein).

At an operation 204, an initial attestation is recorded on a public registry. The initial attestation includes an initial signature and an initial nonce. Creation of the initial nonce is based on a secret value. In some embodiments, operation 204 is performed by an attestation component the same as or similar to attestation component 110 (shown in FIG. 1 and described herein).

At an operation 206, a sequence of attestations that form a chain is generated. Individual attestations include individual signatures and a nonce for a next attestation. The individual signatures use the secret value and an individual nonce of the preceding individual attestation. Creation of the individual nonces is based on the secret value. In some embodiments, operation 206 is performed by an attestation component the same as or similar to attestation component 110 (shown in FIG. 1 and described herein).

At an operation 208, the sequence of attestations is published, on the public registry. In some embodiments, operation 208 is performed by an attestation component the same as or similar to attestation component 110 (shown in FIG. 1 and described herein).

At an operation 210, redemption of the bond is initiated through a redemption transaction that is recorded on the public registry. The redemption is delayed by a wait period from recording of the redemption transaction. In some embodiments, operation 210 is performed by an initiation component the same as or similar to initiation component 112 (shown in FIG. 1 and described herein).

At an operation 212, previously published attestations are obtained from the one or more oracle servers. In some embodiments, operation 212 is performed by a monitoring component the same as or similar to monitoring component 114 (shown in FIG. 1 and described herein).

At an operation 214, the individual nonces of the previously published attestations are compared to previously recorded nonces in the sequence. In some embodiments, operation 214 is performed by a comparison component the same as or similar to comparison component 116 (shown in FIG. 1 and described herein).

At an operation 216, responsive to a match between at least two of the previously recorded nonces in the sequence, a notification regarding reuse of a duplicate nonce in the sequence is published. Publication includes (i) at least two attestations in the sequence, (ii) at least two signatures included in the at least two attestations, and (iii) the duplicate nonce, exposes both the secret value and the bond. In some embodiments, operation 216 is performed by an exposure component 118 the same as or similar to exposure component 118 (shown in FIG. 1 and described herein).

At an operation 218, the bond identified by the bond identifier is held. The bond is associated with the sequence of attestations recorded by the oracle server. In some embodiments, operation 218 is performed by a holding component the same as or similar to holding component 120 (shown in FIG. 1 and described herein).

At an operation 220, responsive to exposure of the secret value, the bond identified by the bond identifier is forfeited. In some embodiments, operation 220 is performed by a forfeiture component the same as or similar to forfeiture component 122 (shown in FIG. 1 and described herein).

At an operation 222, responsive to the redemption transaction being recorded and further responsive to expiration of the wait period, the bond is redeemed. In some embodiments, operation 222 is performed by a redemption component the same as or similar to redemption component 124 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to facilitate cryptographic attestation chains using bonded oracles, the system comprising:
   one or more oracle servers including one or more processors configured by one or more machine-readable instructions to:
      publish a bond identifier that identifies a bond, wherein the bond is held by a collateral service provider, and wherein the bond represents an amount of economic value that is at stake based on operations of the one or more oracle servers;
      record an initial attestation on a public registry, wherein the initial attestation includes an initial signature and an initial nonce, wherein creation of the initial nonce is based on a secret value;
      generate a sequence of attestations that form a chain starting with the initial attestation, wherein individual attestations include individual signatures and a nonce for a next attestation, wherein the individual signatures use the secret value and an individual nonce of the preceding individual attestation, and wherein creation of the individual nonces is based on the secret value;
      publish, on the public registry, the sequence of attestations that form the chain; and
      initiate redemption of the bond through a redemption transaction that is recorded on the public registry, wherein the redemption is delayed by a wait period from recording of the redemption transaction;
   a monitoring server including one or more monitoring processors configured by one or more machine-readable instructions to:
      obtain from the one or more oracle servers previously published attestations;
      compare the individual nonces of the previously published attestations to previously recorded nonces in the sequence; and
      responsive to a match between at least two of the previously recorded nonces in the sequence, publish a notification regarding reuse of a duplicate nonce in the sequence, wherein publication of (i) at least two attestations in the sequence, (ii) at least two signatures included in the at least two attestations, and (iii) the duplicate nonce, exposes both the secret value and the bond; and
   the collateral service provider configured to:
      hold the bond identified by the bond identifier, wherein the bond is associated with the sequence of attestations recorded by the oracle server;

responsive to exposure of the secret value, forfeit the bond identified by the bond identifier; and responsive to the redemption transaction being recorded and further responsive to expiration of the wait period, redeem the bond.

2. The system of claim 1, wherein the public registry is the blockchain of the main net of the Bitcoin network.

3. The system of claim 2, wherein the collateral service provider is implemented as one or more smart contracts on the blockchain.

4. The system of claim 1, wherein the individual attestations in the sequence form the chain by including links to preceding ones of the individual attestations.

5. The system of claim 1, wherein an individual attestation in the sequence further includes a value created by hashing at least some content of a preceding attestation that precedes the individual attestation.

6. The system of claim 1, wherein the amount of economic value represented by the bond is forfeited by burning the bond.

7. The system of claim 1, wherein the bond includes a cryptographic key.

8. The system of claim 7, wherein the collateral service provider provides an Application Programming Interface (API) that is responsive to the cryptographic key.

9. The system of claim 1, wherein recording of two adjacent attestations in the sequence of attestations spans at least a predetermined period.

10. The system of claim 9, wherein the two adjacent attestations include information that reflects passage of the predetermined period.

11. The system of claim 1, wherein the collateral service provider is a collateral server that includes one or more processors configured by a set of machine-readable instructions to hold, forfeit, and/or redeem the bond.

12. The system of claim 1, wherein the collateral service provider is implemented as one or more contracts and/or sub-contracts operating within the one or more oracle servers.

13. The system of claim 1, wherein the one or more oracle servers include a second oracle server configured to:
    generate a second sequence of attestations that form a second chain; and
    publish the second sequence;
    wherein the individual attestations that form the chain include commitments to one or more attestations that have been published as part of the second chain of the second oracle server.

14. The system of claim 13, wherein individual attestations that are part of the second chain include references to one or more attestations in the chain.

15. A method of facilitating cryptographic attestation chains using bonded oracles, the method comprising:
    publishing, by one or more oracle servers, a bond identifier that identifies a bond, wherein the bond is held by a collateral service provider, and wherein the bond represents an amount of economic value that is at stake based on operations of the one or more oracle servers;
    recording an initial attestation on a public registry, wherein the initial attestation includes an initial signature and an initial nonce, wherein creation of the initial nonce is based on a secret value;
    generating a sequence of attestations that form a chain starting with the initial attestation, wherein individual attestations include individual signatures and a nonce for a next attestation, wherein the individual signatures use the secret value and an individual nonce of the preceding individual attestation, and wherein creation of the individual nonces is based on the secret value;
    publishing, on the public registry, the sequence of attestations forming the chain; and
    initiating redemption of the bond through a redemption transaction that is recorded on the public registry, wherein the redemption is delayed by a wait period from recording of the redemption transaction;
    obtaining, from the one or more oracle servers, previously published attestations;
    comparing the individual nonces of the previously published attestations to previously recorded nonces in the sequence;
    responsive to a match between at least two of the previously recorded nonces in the sequence, publishing a notification regarding reuse of a duplicate nonce in the sequence, wherein publication of (i) at least two attestations in the sequence, (ii) at least two signatures included in the at least two attestations, and (iii) the duplicate nonce, exposes both the secret value and the bond;
    holding the bond identified by the bond identifier, wherein the bond is associated with the sequence of attestations recorded by the oracle server;
    responsive to exposure of the secret value, forfeiting the bond identified by the bond identifier; and
    responsive to the redemption transaction being recorded and further responsive to expiration of the wait period, redeeming the bond.

16. A system configured to facilitate cryptographic attestation chains using bonded oracles, the system comprising:
    one or more oracle servers including one or more processors configured by one or more machine-readable instructions to:
        publish a bond identifier that identifies a bond, wherein the bond is held for a fixed duration by a collateral service provider, and wherein the bond represents an amount of economic value that is at stake based on operations of the one or more oracle servers;
        record an initial attestation on a public registry, wherein the initial attestation includes an initial signature and an initial nonce, wherein creation of the initial nonce is based on a secret value;
        generate a sequence of attestations that form a chain, wherein individual attestations include individual signatures and a nonce for a subsequent attestation, wherein the individual signatures use the secret value and an individual nonce of the preceding individual attestation, and wherein creation of the individual nonces is based on the secret value;
        publish the sequence of attestations forming the chain; and
        initiate redemption of the bond, within the fixed duration, through a redemption transaction that is recorded on the public registry;
    a monitoring server including one or more monitoring processors configured by one or more machine-readable instructions to:
        obtain, from the one or more oracle servers, previously published attestations;
        compare the individual nonces of the previously published attestations to previously recorded nonces in the sequence; and
        responsive to a match between at least two of the previously recorded nonces in the sequence, publish a notification regarding reuse of a duplicate nonce in the sequence, wherein publication of (i) at least two attestations in the sequence, (ii) at least two signatures included in the at least two attestations, and (iii) the duplicate nonce, exposes both the secret value and the bond; and the collateral service provider configured to:
   hold the bond identified by the bond identifier, wherein the bond is associated with the sequence of attestations recorded by the oracle server;
   responsive to exposure of the secret value, forfeit the bond identified by the bond identifier; and
   responsive to the redemption transaction being recorded, redeem the bond.

17. The system of claim 16, wherein the collateral service provider is further configured to:
   responsive to expiration of the fixed duration for holding the bond, and further responsive to the secret value not being exposed, renew the fixed duration.

\* \* \* \* \*